(12) United States Patent
Chen et al.

(10) Patent No.: US 11,995,389 B2
(45) Date of Patent: May 28, 2024

(54) CONNECTOR STRUCTURE, AND SKEW CALCULATION METHOD AND DEVICE

(71) Applicant: ZTE Corporation, Shenzhen (CN)

(72) Inventors: Xinjian Chen, Shenzhen (CN); Yonghui Ren, Shenzhen (CN); Rongxing Ban, Shenzhen (CN); Yingxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 315 days.

(21) Appl. No.: 17/417,877

(22) PCT Filed: Oct. 14, 2019

(86) PCT No.: PCT/CN2019/111001
§ 371 (c)(1),
(2) Date: Jun. 24, 2021

(87) PCT Pub. No.: WO2020/134365
PCT Pub. Date: Jul. 2, 2020

(65) Prior Publication Data
US 2022/0100945 A1    Mar. 31, 2022

(30) Foreign Application Priority Data
Dec. 25, 2018   (CN) .......................... 201811594023.4

(51) Int. Cl.
*G06F 30/39*   (2020.01)
*G06F 13/40*   (2006.01)
(Continued)

(52) U.S. Cl.
CPC ........ *G06F 30/394* (2020.01); *G06F 13/4068* (2013.01); *G06F 2115/12* (2020.01)

(58) Field of Classification Search
USPC ................................ 716/133, 134, 135, 136
See application file for complete search history.

(56) References Cited

U.S. PATENT DOCUMENTS

| 8,935,125 B1 | 1/2015 | Fu et al. |
| 2003/0005397 A1 | 1/2003 | Larsen |

(Continued)

FOREIGN PATENT DOCUMENTS

| CN | 1659810 A | 8/2005 |
| CN | 101558491 A | 10/2009 |

(Continued)

OTHER PUBLICATIONS

International Search Report for corresponding application PCT/CN2019/111001 filed Oct. 14, 2019; Mail date Jan. 16, 2020.

*Primary Examiner* — Brian Ngo
(74) *Attorney, Agent, or Firm* — CANTOR COLBURN LLP

(57) ABSTRACT

Provided are a connector structure, and a skew calculation method and device. Specifically, the connector structure includes: a first Printed Circuit Board (PCB) (12), which includes a first board (122) and a second board (124), and is connected to a testing device; and a second PCB (14), which includes a third board (142) and a fourth board (144), and is connected to the testing device. The first board (122) is connected to the third board (142) through a connector (16).

18 Claims, 5 Drawing Sheets

(51) Int. Cl.
 *G06F 30/394* (2020.01)
 *G06F 115/12* (2020.01)

(56) References Cited

U.S. PATENT DOCUMENTS

| | | |
|---|---|---|
| 2004/0090757 A1 | 5/2004 | Murata |
| 2004/0177302 A1 | 9/2004 | Mori |
| 2006/0164066 A1 | 7/2006 | Shioiri et al. |
| 2008/0143379 A1 | 6/2008 | Norman |
| 2008/0256408 A1 | 10/2008 | Iwamoto |
| 2009/0105977 A1 | 4/2009 | Furukawa |
| 2010/0323536 A1 | 12/2010 | Crane |
| 2013/0307579 A1* | 11/2013 | Wang ............... H03K 19/003 326/16 |
| 2014/0209370 A1 | 7/2014 | Minich |
| 2017/0118838 A1 | 4/2017 | Williams |
| 2018/0156868 A1* | 6/2018 | Batz ............... G01R 31/3172 |

FOREIGN PATENT DOCUMENTS

| | | | |
|---|---|---|---|
| CN | 101738534 A * | | 6/2010 |
| CN | 102156255 A | | 8/2011 |
| CN | 102498623 A | | 6/2012 |
| CN | 103983821 A | | 8/2014 |
| JP | S62199127 A | | 9/1987 |
| JP | H10233742 A | | 9/1998 |
| JP | 2006208060 A | | 8/2006 |
| WO | 2004074857 A1 | | 9/2004 |
| WO | 2009087874 A1 | | 7/2009 |

* cited by examiner

CONNECTOR STRUCTURE, AND SKEW CALCULATION METHOD AND DEVICE

CROSS-REFERENCE TO RELATED APPLICATION

The present disclosure claims priority to Chinese Patent Priority No. 201811594023.4, filed to the China National Intellectual Property Administration on Dec. 25, 2018, the disclosure of which is hereby incorporated by reference in its entirety.

TECHNICAL FIELD

The disclosure relates to the field of communications, and in particular to a connector structure, and a skew calculation method and device.

BACKGROUND

With the gradual increase of system capacity, high-speed Serdes has entered the 56 Gbps/lane era, and major chip manufacturers, system manufacturers and standards organizations have started the research of 112 Gbps. The rate rise of single channel has more and more strict requirements on a delay difference (skew) between differential signals P/N. In a high speed serial system, high speed connectors (conventional backplane connectors, orthogonal connectors and cable connectors, etc.) are passive components of high speed interconnection between a single board and a backplane and between a single board and a single board. Therefore, the skew in a differential pair of the high-speed connector also affects the performance of the whole system. It is a very important signal integrity parameter, which needs to be accurately tested and evaluated.

At present, for the evaluation of the skew of the connector, a method is to use data of pure connector simulation. The method is too ideal without considering the deviation brought by the actual machining process, and cannot match with the actual result. Another method is to use a test board for testing. However, although the conventional method using a test board adopts many ways to reduce the wiring skew of a Printed Circuit Board (PCB), such as arranging wires according to angles, rotating the single board, strictly controlling wire width and wire spacing and using low DK materials, there is still an error caused by the inconsistency of P/N of PCB wiring, and 100% accurate skew parameter of pure connector cannot be obtained, which influences the result. Generally, the skew of the high speed connector is at ps magnitude, but the error caused by a test fixture will be at the same magnitude or greater than the skew of the pure connector. If the influence of PCB wiring cannot be completely removed, the accuracy of system performance evaluation will be influenced, especially when the rate is increased to 112 Gbps, a single UI is only 8.9 ps, and then the skew of PCB wiring will bring great interference, so it is necessary to reduce or even remove its influence. However, at present, there is no way to completely remove the skew of PCB wiring and obtain the actual skew parameter in the differential pair of the high-speed pure connector, which causes great troubles to simulation evaluation of the high speed serial system and product selection of the connector.

SUMMARY

Embodiments of the disclosure provide a connector structure, and a skew calculation method and device to at least solve the problem in the related art that a large error is introduced in the calculation of a skew of a connector due to failing to remove the skew of PCB wiring, which influences the true skew performance evaluation of the connector and the accuracy of system evaluation.

According to an embodiment of the disclosure, a connector structure is provided, which may include: a first PCB, which includes a first board and a second board, and is connected to a testing device; and a second PCB, which includes a third board and a fourth board, and is connected to the testing device. The first board is connected to the third board through a connector.

According to another embodiment of the disclosure, a skew calculation method is provided, which is applied to a testing device connected to the connector structure, and may include that: a first skew skew1 among the first board, the connector and the third board is measure; a second skew skew2 of the second board and a third skew skew3 of the fourth board are measured; and a skew parameter skew of the connector is calculated according to the skew1, the skew2 and the skew3.

According to another embodiment of the disclosure, a skew calculation device is provided, which is applied to the testing device connected to the connector structure, and may include: a first measuring module, configured to measure the first skew skew1 among the first board, the connector and the third board; a second measuring module, configured to measure the second skew skew2 of the second board; a third measuring module, configured to measure the third skew skew3 of the fourth board; and a calculating module, configured to calculate the skew parameter skew of the connector according to the skew1, the skew2 and the skew3.

According to yet another embodiment of the disclosure, a storage medium is also provided. The storage medium stores a computer program. When configured to run, the computer program performs steps in any of the above method embodiments.

According to yet another embodiment of the disclosure, an electronic device is also provided, which includes a memory and a processor. The memory stores a computer program. The processor is configured to run the computer program, so as to perform steps in any of the above method embodiments.

Through this disclosure, by measuring the skew parameter of the board, which is in the same PCB as the board connected to the connector, in two PCBs connected through the connector, the skew of the connector is calculated indirectly through the parameter.

BRIEF DESCRIPTION OF THE DRAWINGS

The accompanying drawings described here are used for providing further understanding of the disclosure, and constitute a part of the disclosure. Schematic embodiments of the disclosure and description thereof are used for illustrating the disclosure and not intended to form an improper limit to the disclosure. In the accompanying drawings.

DETAILED DESCRIPTION OF THE EMBODIMENTS

The disclosure is elaborated below with reference to the accompanying drawings and embodiments. It is to be noted that the embodiments in the disclosure and characteristics in the embodiments may be combined without conflicts.

It is to be noted that the terms like "first" and "second" in the specification, claims and accompanying drawings of the disclosure are used for differentiating the similar objects, but do not have to describe a specific order or a sequence.

First Embodiment

Figure 1:
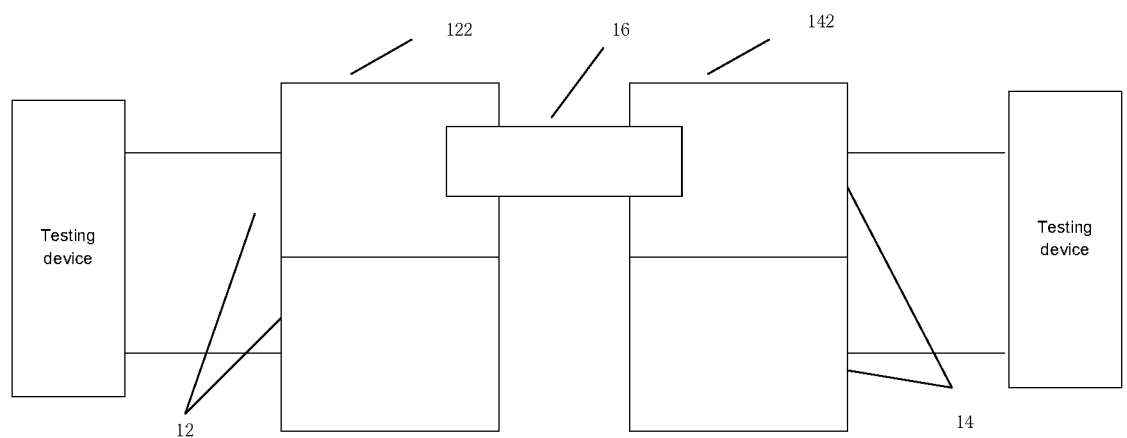
FIG. 1 is a structure diagram of a connector structure according to an embodiment of the disclosure.

In the present embodiment, a connector structure is provided. FIG. 1 is a structure diagram of a connector structure according to an embodiment of the disclosure. As shown in FIG. 1, the connector structure includes: a first PCB 12 and a second PCB 14.

The first PCB 12 includes a first board 122 and a second board 124, and is connected to a testing device.

The second PCB 14 includes a third board 142 and a fourth board 144, and is connected to the testing device. The first board 122 is connected to the third board 142 through a connector 16.

Figure 2:
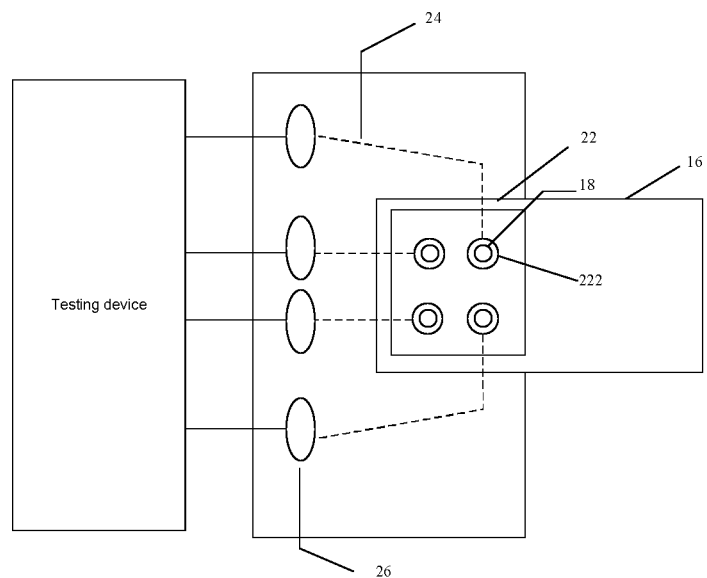
FIG. 2 is a structure diagram of another connector structure according to an embodiment of the disclosure.

FIG. 2 is a structure diagram of another connector structure according to an embodiment of the disclosure. As shown in FIG. 2, each board at least includes: a hole array 22, a wire 24 and a test point 26. The hole array 22 has an array hole 222, and the position of the array hole 222 overlaps with the position of a differential pin 18 of the connector 16. The wire 24 is located inside each board, one end of the wire is configured to be connected with the differential pin 18 of the connector 16 through the array hole 222, and the other end is configured to be connected with the test point 26. The test point 26 extends into each board and is configured to be connected with the wire 24 and the testing device.

Figure 3:
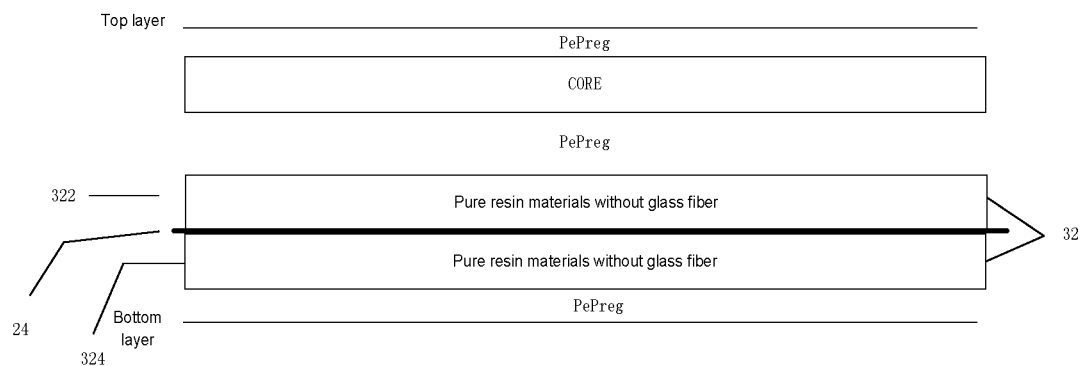
FIG. 3 is a sectional view of a PCB according to an embodiment of the disclosure.

FIG. 3 is a sectional view of a PCB according to an embodiment of the disclosure. As shown in FIG. 3, the wire 24 is arranged in a wiring layer 32 in each board. The wiring layer 32 includes: an upper wiring layer 322 and a lower wiring layer 324. The wire 24 is between the upper wiring layer 322 and the lower wiring layer 324. The upper wiring layer 322 and the lower wiring layer 324 are GND planes. Core is a base material of the PCB, and prepreg is a thin insulating material of the PCB.

When the skew is calculated through the connector structure of the disclosure, not only the influence of skew parameter of PCB wiring on the calculation of the skew of the connector can be eliminated, but also the skew performance of a high speed connector can be improved, and the high precision of the skew of the tested connector can be ensured.

Optionally, the upper wiring layer 322 and the lower wiring layer 324 are composed of pure resin materials without glass fiber.

It is to be noted that the reason of using the pure resin materials without glass fiber is to prevent skew interference caused by glass effect. The use of the pure resin materials without glass fiber makes the skew depend only on the physical length and shape of the wire, independent of other factors. In addition, the materials include but are not limited to AP materials and PTFE materials.

Moreover, in FIG. 3, dielectric materials of other layers except the wire 24, the upper wiring layer 322 and the lower wiring layer 324 include but are not limited to FR4 plate, M6G, M7NE and other high speed plates.

Specifically, through the above PCB structure, the skew of PCB wiring may be reduced to a very low level, thereby ensuring the accuracy of the obtained skew parameter of the connector. The use of this structure can not only eliminate the skew caused by a glass fiber effect, but also greatly reduce the skew between the differential pair P/N. Verified by test, compared with the conventional M6G board, the PCB with the same shape and wiring length uses differential wiring, and the maximum skew may be reduced from 2.44 ps to 0.47 ps by using the above PCB structure. At the same time, there is also no need for special control of the wiring, which saves wiring space.

Figure 4:
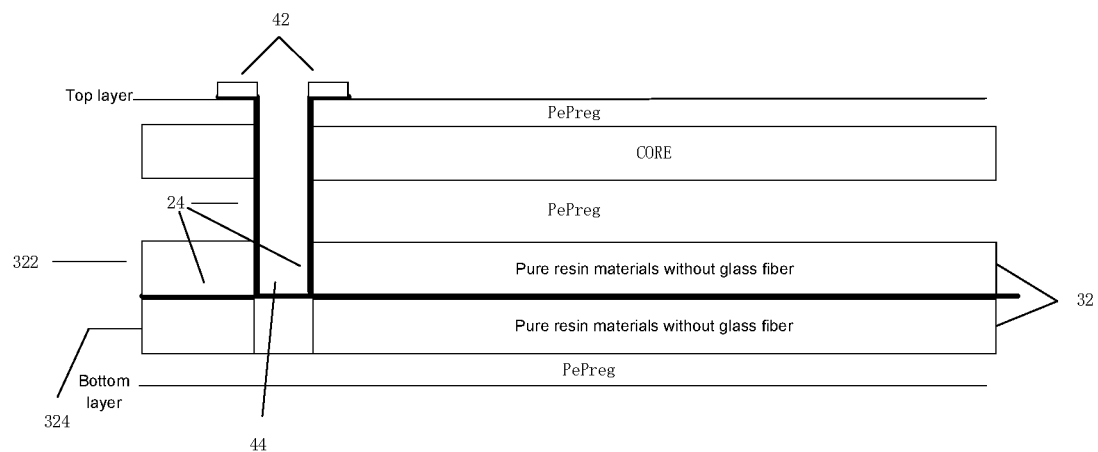
FIG. 4 is a sectional view of another PCB according to an embodiment of the disclosure.

FIG. 4 is a sectional view of another PCB according to an embodiment of the disclosure. As shown in FIG. 4, the test point 26 includes: a test pad 42, which is located on the surface of the board and is configured for the testing device to connect; and a via hole 44, which extends into the wiring layer 32 of the board and is configured to be connected with the wire 24 and the test pad 42.

It is to be noted that the test pad 42 may be either an SMA pad, which is configured as SMA coaxial connection test, or a probe point test pad.

Optionally, the number of hole arrays 22 is one or more, the number of wires 24 is one or more, and the number of test points 26 is one or more.

Optionally, the size and shape of the first board 122 are the same as that of the second board 124, and the size and shape of the third board 142 are the same as that of the fourth board 144.

Optionally, the hole array 22 in the first board 122 is distributed at the same position as the hole array 22 in the second board 124, and the hole array 22 in the third board 142 is distributed at the same position as the hole array 22 in the fourth board 144.

Optionally, the length and distribution of the wire 24 in the first board 122 are the same as that of the wire 24 in the third board 142, and the length and distribution of the wire in the second board 124 are the same as that of the wire in the fourth board.

Optionally, the test point 26 in the first board 122 is distributed at the same position as the test point 26 in the second board 124, and the test point 26 in the third board 142 is distributed at the same position as the test point 26 in the fourth board 144.

It can be seen that in the present embodiment, because the first board is the same as the second board, and they are located in the same PCB, the third board is the same as the fourth board, and they are also located in the same PCB. Moreover, because there is no connector for connection between the third board and the fourth board, the skew of the third board and the fourth board tested by the testing device is the skew without the connector. In fact, because the first board is the same as the second board, the skew is the same. Similarly, the third board is the same as the fourth board, so the skew is also the same. Therefore, in the subsequent calculation of the skew of the connector, the skew of the first board may be replaced by the skew of the second board, and the skew of the third board may be replaced by the skew of the fourth board by using a substitution method.

Therefore, the skew of the connector may be calculated by using algebraic subtraction. That is, by measuring, the skew1 of the second board and the skew2 of the fourth board are subtracted from the skew among the first board, the connector and the third board. When the algebraic subtraction is used, because the wiring of the first board is the same as that of the second board, and the wiring of the third board is the same as that of the fourth board, the same skew is actually deleted when the skew1 and skew2 are subtracted from the skew. In this way, the interference of wiring skew will be greatly reduced, so the calculation result can be guaranteed to be the skew of the pure connector.

It is also to be noted that ensuring that the first board is the same as the second board, and the third board is the same as the fourth board is only an example of the present embodiment. Specifically, even if the first board is different from the second board and the third board is different from the fourth board, a similar method may actually also be used for calculation. In practical use, in order to save materials and achieve more portable use, multiple PCBs may need to be spliced. That is, there is inevitably a difference between the first board and the second board and between the third board and the fourth board. In order to solve the above problem, the skews of the corresponding boards may be respectively obtained by measuring and identifying in advance the boards with different sizes and shapes, different lengths and distributions, and different distribution positions of the test points. When the skew of the connector is calculated, the skew parameters of the boards with different specifications can be known by querying a database. Therefore, the skew of the connection may be obtained by only comparing a multiple relationship of the skews of the first board and the second board and the multiple relationship of the skews of the third board and the fourth board after identification information of the first board and the third board is input, that is, by measuring skew values of the second board and the fourth board and performing multiple operation and the algebraic subtraction on the skew values and the skew among the first board, the connector and the third board.

Optionally, the types of the connector include: straight crimp male connector, straight crimp female connector, bent crimp male connector, and bent crimp female connector.

Specifically, for different types of connector, the following different connector structures are also provided in the present embodiment, so as to understand the solution recorded in the present embodiment.

Figure 5:
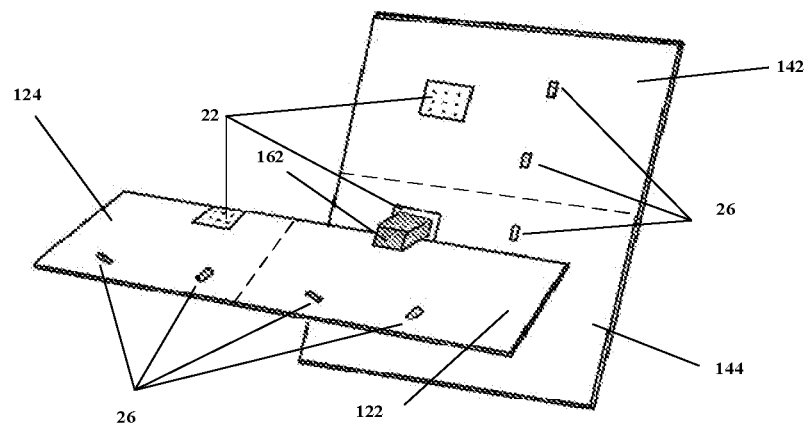
FIG. 5 is a structure diagram of a straight male bent female connector structure according to an embodiment of the disclosure.

FIG. 5 is a structure diagram of a straight male bent female connector structure according to an embodiment of the disclosure. As shown in FIG. 5, the hole array 22 of the first board 122 in the connector structure is at the edge of the board, while the third board 124 connects a straight crimp male connector 162 to the hole array 22; at the same time, the hole array 22 on the third board 124 may be arranged in the board.

The hole array 22, the wire 24 (not shown) and the test pad 26 of the second board 124 are consistent with that of the first board 122. The hole array 22 of the second board 124 is not set as the bent crimp female connector 164.

The hole array 22, the wire 24 (not shown) and the test pad 26 of the fourth board 144 are consistent with that of the third board 142. The hole array 22 of the fourth board 144 is not set as the straight crimp male connector 162.

Figure 6:
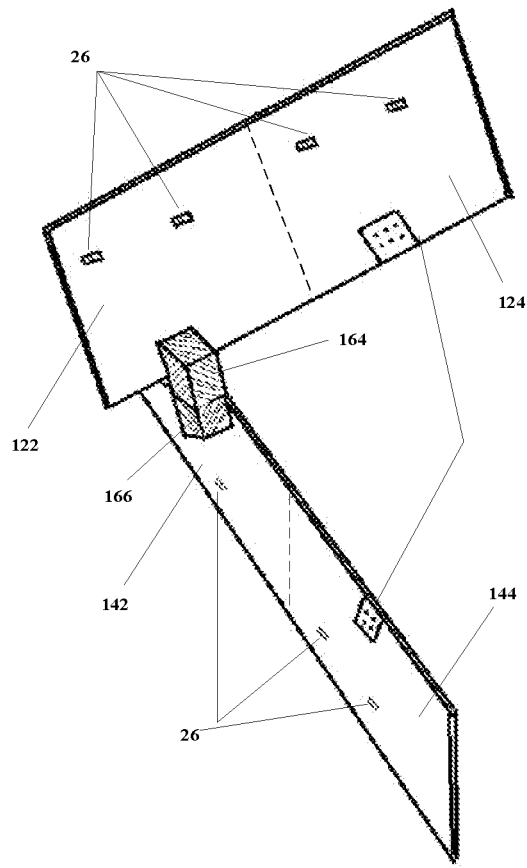
FIG. 6 is a structure diagram of a connector structure with orthogonal architecture according to an embodiment of the disclosure.

FIG. 6 is a structure diagram of a connector structure with orthogonal architecture according to an embodiment of the disclosure. As shown in FIG. 6, the first board 122 in the connector structure presses the bent crimp female connector 164 onto the hole array 22, at the same time, the hole array 22 of the first board 122 must be arranged at the edge of the first board 122.

The third board 124 presses the bent crimp male connector 166 onto the hole array 22, at the same time, the hole array 22 of the third board 124 may be arranged in the board. The hole array 22 of the third board 122 must also be arranged at the edge of the third board 122.

The hole array 22, the wire 24 (not shown) and the test pad 26 of the second board 124 are consistent with that of the first board 122. The hole array 22 of the second board 124 is not set as the bent crimp female connector 164. (A bonding pad in the board is not shown because the third board and the fourth board are arranged in opposite directions.) The hole array 22, the wire 24 (not shown) and the test pad 26 of the fourth board 144 are consistent with that of the third board 142. The hole array 22 of the fourth board 144 is not set as the bent crimp male connector 166.

Figure 7:
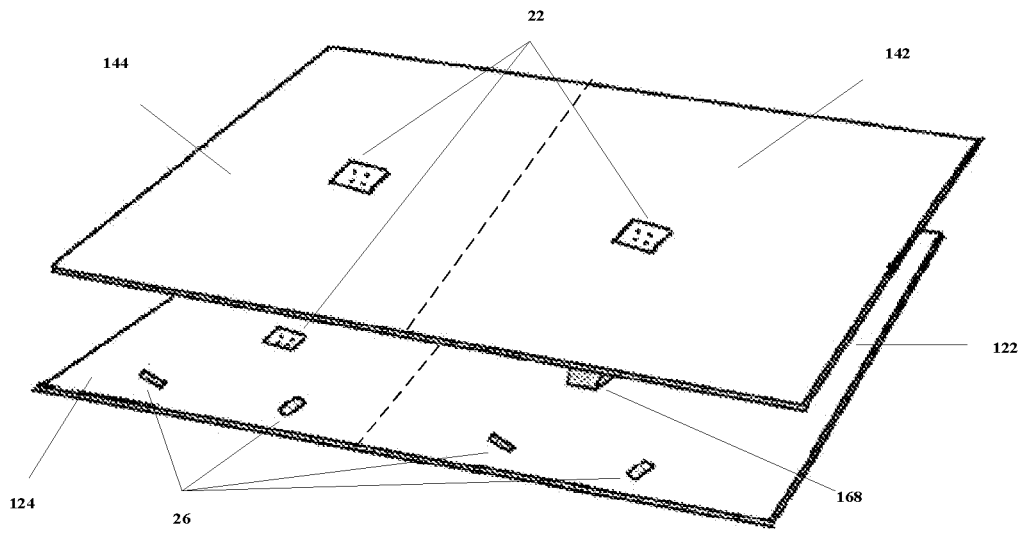
FIG. 7 is a structure diagram of a board-to-board connector structure according to an embodiment of the disclosure.

FIG. 7 is a structure diagram of a board-to-board connector structure according to an embodiment of the disclosure. As shown in FIG. 7, the first board 122 presses the straight crimp female connector 168 onto the hole array 22, at the same time, the hole array 22 may be placed either at the edge of the first board 122 or in the first board 122.

The third board 142 presses the straight crimp male connector 168 onto the hole array 22, at the same time, the hole array 22 may be placed either at the edge of the third board 142 or in the third board 142.

The hole array 22, the wire 24 (not shown) and the test pad 26 of the second board 124 are consistent with that of the first board 122. The hole array 22 of the second board 124 is not set as the straight crimp female connector 168.

The hole array 22, the wire 24 (not shown) and the test pad 26 of the fourth board 144 are consistent with that of the third board 142. The hole array 22 of the fourth board 144 is not set as the straight crimp male connector 162.

Figure 8:
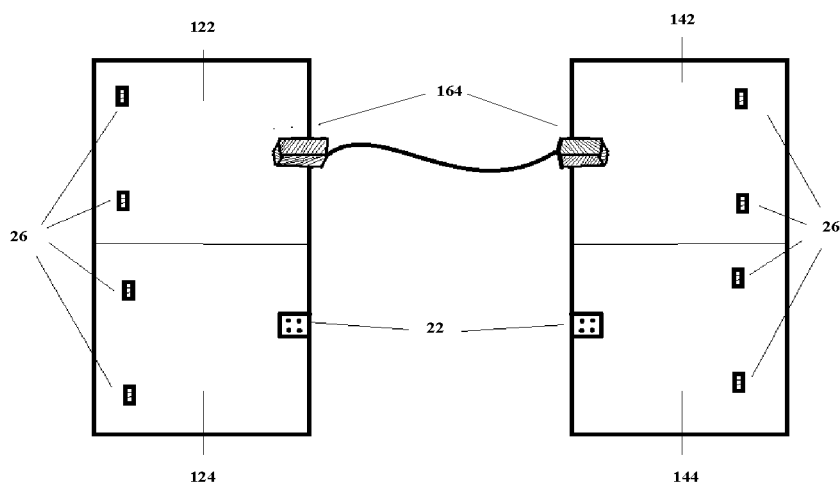
FIG. 8 is a structure diagram of a cable connector structure according to an embodiment of the disclosure.

FIG. 8 is a structure diagram of a cable connector structure according to an embodiment of the disclosure. As shown in FIG. 8, the first board 122 presses the bent crimp female connector 164 onto the hole array 22, at the same time, the hole array 22 may be placed either at the edge of the first board 122 or in the first board 122.

The third board 142 presses the bent crimp female connector 164 onto the hole array 22, at the same time, the hole array 22 may be placed either at the edge of the third board 142 or in the third board 142.

The hole array 22, the wire 24 (not shown) and the test pad 26 of the second board 124 are consistent with that of the first board 122. The hole array 22 of the second board 124 is not set as the bent crimp female connector 164.

The hole array 22, the wire 24 (not shown) and the test pad 26 of the fourth board 144 are consistent with that of the third board 142. The hole array 22 of the fourth board 144 is not set as the bent crimp female connector 164.

Second Embodiment

Figure 9:
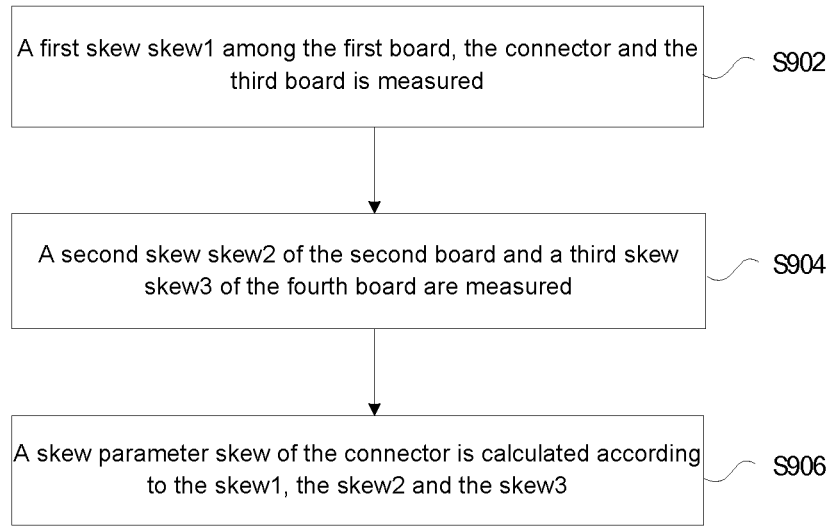
FIG. 9 is a flowchart of a skew calculation method according to an embodiment of the disclosure.

In the present embodiment, a skew calculation method is provided, which is applied to the testing device connected to the connector structure in the first embodiment. FIG. 9 is a flowchart of a skew calculation method according to an embodiment of the disclosure. As shown in FIG. 9, the flow includes the following steps.

At S902, a first skew skew1 among the first board, the connector and the third board is measured.

At S904, a second skew skew2 of the second board and a third skew skew3 of the fourth board are measured.

At S906, a skew parameter skew of the connector is calculated according to the skew1, the skew2 and the skew3.

Optionally, that the skew is calculated according to the skew1, the skew2 and the skew3 is determined through the following formula: skew=skew1−skew2−skew3.

It is to be noted that the above formula can be realized only the first board is the same as the second board, and the third board is the same as the fourth board.

Specifically, when the skew1 is calculated, S parameters of the test pad, the via hole, the wire and the array hole of the first part and the test pad, the via hole, the wire and the array hole of the connector and the third part need to be first tested through a vector network. Then, the skew1 is calculated through an insertion loss impact response.

When the skew2 is calculated, the S parameters of the test pad, the via hole, the wire and the array hole of the second part need to be first tested through the vector network. Then, the skew2 is calculated through a return loss impact response.

Similarly, when the skew3 is calculated, the S parameters of the test pad, the via hole, the wire and the array hole of the fourth part need to be first tested through the vector network. Then, the skew3 is calculated through the return loss impact response.

Moreover, considering the situation of splicing multiple PCBs, the first board is different from the second board, and the third board is different from the fourth board. Therefore, for the above situation, another calculation formula is provided in the present embodiment. That is, skew=skew1−n*skew2−M*skew3, where both n and m are positive integers.

Specifically, n is the ratio corresponding to the skew of the first board and the skew of the third board in the database, and m is the ratio corresponding to the skew of the second board and the skew of the fourth board in the database.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the disclosure substantially or the part making a contribution to the prior art can be embodied in the form of software product; the computer software product is stored in a storage medium (for example, a Read-Only Memory (ROM)/Random Access Memory (RAM), a magnetic disk, and a compact disc) and includes a number of instructions to make a terminal device (which can be a cell phone, a personal computer, a server or a network device, etc.) perform all or part of the method in each embodiment of the disclosure.

Third Embodiment

In the present embodiment, a skew calculation device is also provided, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 10:
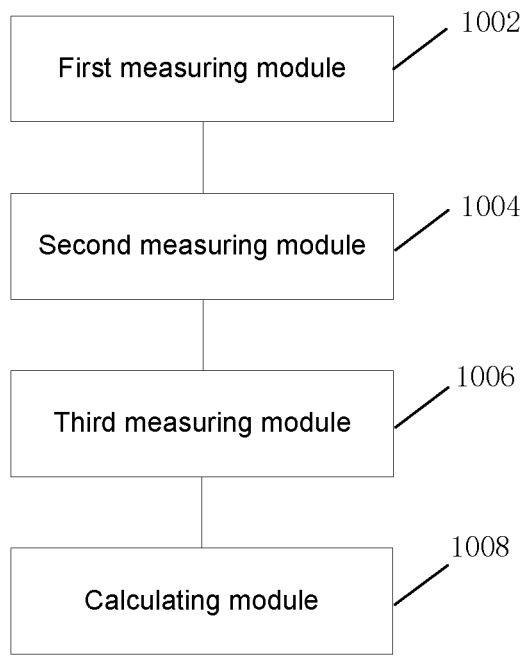
FIG. 10 is a structural block diagram of a skew calculation device according to an embodiment of the disclosure.

FIG. 10 is a structural block diagram of a skew calculation device according to an embodiment of the disclosure. As shown in FIG. 10, the device includes: a first measuring module 1002, a second measuring module 1004, a third measuring module 1006 and a calculating module 1008.

The first measuring module 1002 is configured to measure the first skew skew1 among the first board, the connector and the third board.

The second measuring module 1004 is configured to measure the second skew skew2 of the second board.

The third measuring module 1006 is configured to measure the third skew skew3 of the fourth board.

The calculating module 1008 is configured to calculate the skew parameter skew of the connector according to the skew1, the skew2 and the skew3.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Fourth Embodiment

The embodiment of the disclosure also provides a storage medium. The storage medium stores a computer program. When configured to run, the computer program performs steps in any of the above method embodiments.

Optionally, in the present embodiment, the storage medium may be configured to store a computer program for executing the following steps.

At S1, the first skew skew1 among the first board, the connector and the third board is measured.

At S2, the second skew skew2 of the second board and the third skew skew3 of the fourth board are measured.

At S3, the skew parameter skew of the connector is calculated according to the skew1, the skew2 and the skew3.

Optionally, in the present embodiment, the storage media include, but not limited to, a USB flash disk, a Read-Only Memory (ROM), a Random Access Memory (RAM), a mobile hard disk, a magnetic disk, a compact disc, and other media capable of storing the computer program.

The embodiment of the disclosure also provides an electronic device, which includes a memory and a processor. The memory stores a computer program. The processor is configured to run the computer program, so as to perform steps in any of the above method embodiments.

Optionally, the electronic device may also include a transmission device and an input/output device. The transmission device is connected with the processor, and the input/output device is connected with the processor.

Optionally, in the present embodiment, the processor may be configured to execute the following steps through the computer program.

At S1, the first skew skew1 among the first board, the connector and the third board is measured.

At S2, the second skew skew2 of the second board and the third skew skew3 of the fourth board are measured.

At S3, the skew parameter skew of the connector is calculated according to the skew1, the skew2 and the skew3.

In an exemplary embodiment, the specific examples in the present embodiment may refer to the examples described in the above embodiments and alternative embodiments.

It is apparent that those skilled in the art should appreciate that the above modules and steps of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the disclosure is not limited to any particular combination of hardware and software.

The above is only the preferred embodiments of the disclosure and not intended to limit the disclosure; for those skilled in the art, the disclosure may have various modifications and changes. Any modifications, equivalent replacements, improvements and the like within the principle of the disclosure should fall within the protection scope of the claims of the disclosure.

INDUSTRIAL APPLICABILITY

Through the disclosure, by measuring the skew parameter of the board, which is in the same PCB as the board connected to the connector, in two PCBs connected through the connector, the skew of the connector is calculated indirectly through the parameter. When the skew is calculated through the connector structure of the disclosure, not only the influence of the skew parameter of PCB wiring on the calculation of the skew of the connector can be eliminated, but also the skew performance of the high speed connector can be improved, and the high precision of the skew of the tested connector can be ensured.

What is claimed is:

1. A connector structure, at least comprising:
a first Printed Circuit Board (PCB), which comprises a first board and a second board, and is connected to a testing device;
a second PCB, which comprises a third board and a fourth board, and is connected to the testing device;
wherein, the first board is connected to the third board through a connector;
wherein each board at least comprises: a hole array, a wire and a test point;
the hole array has an array hole, and the position of the array hole overlaps with the position of a differential pin of the connector;
the wire is located inside each board, one end of the wire is configured to be connected with the differential pin of the connector through the array hole, and the other end is configured to be connected with the test point; and
the test point extends into each board and is configured to be connected with the wire and the testing device.

2. The connector structure according to claim 1, wherein the wire is arranged in a wiring layer in each board; the wiring layer comprises: an upper wiring layer and a lower wiring layer, the wire is between the upper wiring layer and the lower wiring layer, and the upper wiring layer and the lower wiring layer are GND planes.

3. The connector structure according to claim 2, wherein the upper wiring layer and the lower wiring layer are composed of pure resin materials without glass fiber.

4. The connector structure according to claim 2, wherein the test point comprises:
a test pad, which is located on the surface of the board and is configured for the testing device to connect; and
a via hole, which extends into the wiring layer of the board and is configured to be connected with the wire and the test pad.

5. The connector structure according to claim 1, wherein the number of hole arrays is one or more, the number of wires is one or more, and the number of test points is one or more.

6. The connector structure according to claim 1, wherein the size and shape of the first board are the same as that of the second board, and the size and shape of the third board are the same as that of the fourth board.

7. The connector structure according to 1, wherein the hole array in the first board is distributed at the same position as the hole array in the second board, and the hole array in the third board is distributed at the same position as the hole array in the fourth board.

8. The connector structure according to 1, wherein the length and distribution of the wire in the first board are the same as that of the wire in the second board, and the length and distribution of the wire in the third board are the same as that of the wire in the fourth board.

9. The connector structure according to 1, wherein the test point in the first board is distributed at the same position as the test point in the second board, and the test point in the third board is distributed at the same position as the test point in the fourth board.

10. The connector structure according to claim 1, wherein the types of the connector comprise:
straight crimp male connector, straight crimp female connector, bent crimp male connector, and bent crimp female connector.

11. A skew calculation method, applied to a testing device connected to a connector structure as claimed in claim 1, comprising:
measuring a first skew (skew1) among a first board, a connector and a third board;
measuring a second skew (skew2) of a second board and a third skew (skew3) of a fourth board; and
calculating a skew parameter skew of the connector according to the skew1, the skew2 and the skew3.

12. The method according to claim 11, wherein calculating the skew according to the skew1, the skew2 and the skew3 is determined through the following formula:

$$skew = skew1 - skew2 - skew3.$$

13. A skew calculation device, provided in a testing device connected to a connector structure as claimed in claim 1, comprising:
a first measuring module, configured to measure a first skew skew1 among a first board, a connector and a third board;
a second measuring module, configured to measure a second skew skew2 of a second board;
a third measuring module, configured to measure a third skew skew3 of a fourth board; and
a calculating module, configured to calculate a skew parameter skew of the connector according to the skew1, the skew2 and the skew3.

14. The device according to claim 13, wherein the calculating module is further configured to determine the skew through the following formula: skew=skew1−skew2−skew3.

15. A storage medium, storing a computer program, wherein the computer program is configured to perform, when running, the method as claimed in claim 11.

16. An electronic device, comprising a memory and a processor, wherein the memory stores a computer program, and the processor is configured to run the computer program to perform the method as claimed in claim 11.

17. A skew calculation device provided in a testing device connected to a connector structure as claimed in claim 2, comprising:
- a first measuring module, configured to measure a first skew skew1 among a first board, a connector and a third board;
- a second measuring module, configured to measure a second skew skew2 of a second board;
- a third measuring module, configured to measure a third skew skew3 of a fourth board; and
- a calculating module, configured to calculate a skew parameter skew of the connector according to the skew1, the skew2 and the skew3.

18. A skew calculation device provided in a testing device connected to a connector structure as claimed in claim 3, comprising:
- a first measuring module, configured to measure a first skew skew1 among a first board, a connector and a third board;
- a second measuring module, configured to measure a second skew skew2 of a second board;
- a third measuring module, configured to measure a third skew skew3 of a fourth board; and
- a calculating module, configured to calculate a skew parameter skew of the connector according to the skew1, the skew2 and the skew3.

* * * * *